Aug. 30, 1927.
J. LEOPOLD
WATER TURBINE
Filed Jan. 22, 1926
1,640,783
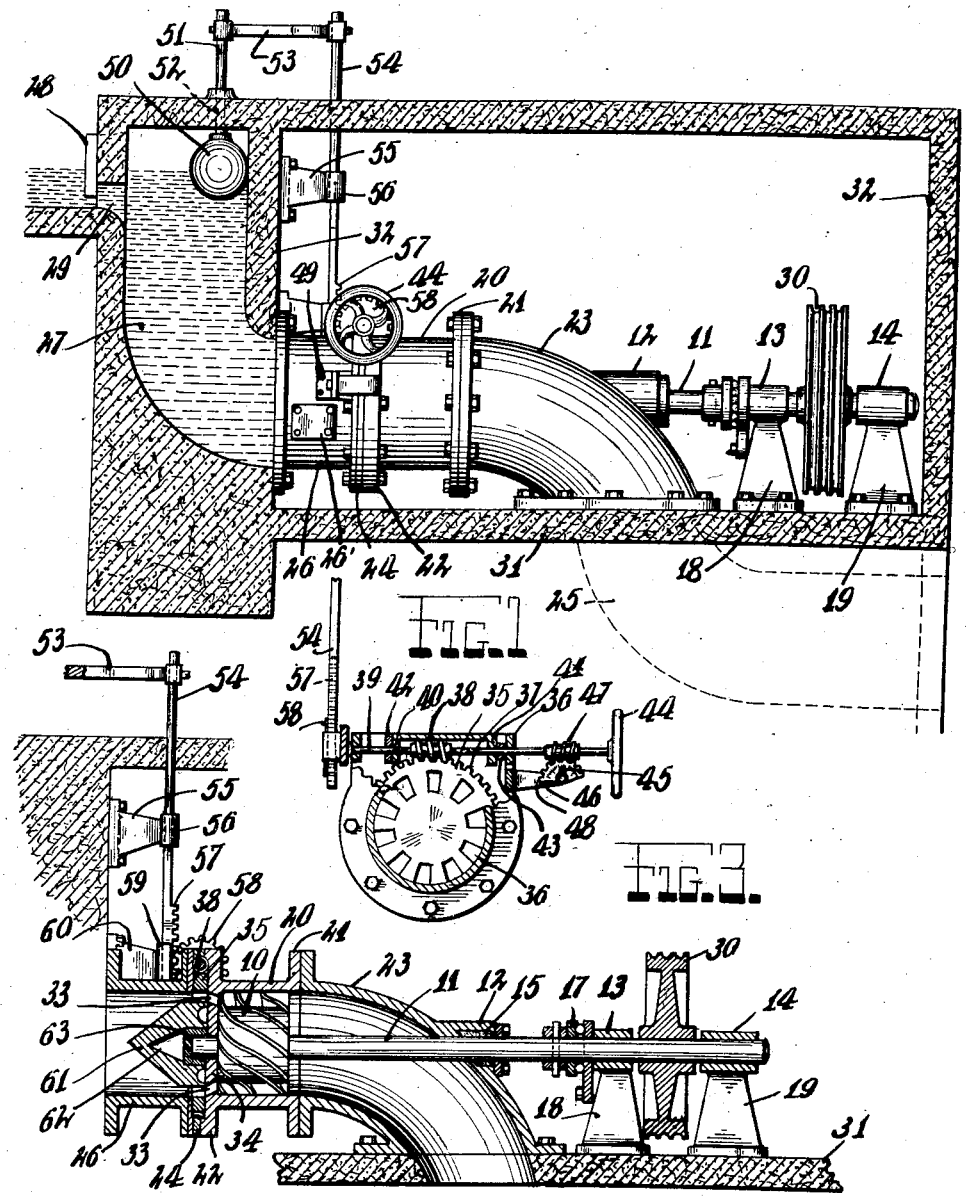
INVENTOR.
Joseph Leopold
BY
ATTORNEY Patented Aug. 30, 1927.

1,640,783

UNITED STATES PATENT OFFICE.

JOSEPH LEOPOLD, OF NEW YORK, N. Y.

WATER TURBINE.

Application filed January 22, 1926. Serial No. 82,981.

This invention relates generally to water turbines used to generate power, the invention has more particular reference to a novel type of water turbine.

The invention has for an object the provision of an improved turbine which will act more efficiently in generating power.

A further object is to provide a device of this nature of simple design and construction.

Another object is to provide an automatic operating means of regulating the flow of water through the turbine.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved water turbine as it will appear when installed and ready for operation.

Fig. 2 of the drawing is a vertical central sectional view of my improved device.

Fig. 3 of the drawing, is a front elevational view, partly in section, showing certain parts of the automatic operating mechanism.

As here embodied my improved water turbine comprises a rotor 10, of cylindrical contour having helical fins or projections on its periphery, and having an axial aperture to accommodate a shaft 11, rigidly attached thereto and rotatively mounted in suitable bearings 12, 13, and 14, the said bearing 12 being provided with a stuffing box 15, as ordinarily used to prevent leakage of the water. A radial thrust washer 17, of ordinary construction is also provided, such as commonly used for devices of this nature. It is understood that the said bearings 13 and 14, may be suitably supported, as at 18 and 19. It will be further understood that the rotor 10 is rotatively mounted in a rotor case 20, suitably attached by flanges 21 and 22 to a tail device 23 and to the operating mechanism case 24, respectively. The tail device 23 serving as a means of conducting the water, after it has passed over and rotated the rotor 10, to a suitable passage or sluice way 25. The operating mechanism case 24 is suitably attached to a case 26.

Referring in particular to Fig. 1, of the accompanying drawing, in which I have shown my improved device installed ready for operation. It will be understood that the heretofore described mechanism is placed so as to utilize a drop or head of water, designated by the reference numeral 27, maintained and regulated by opening and closing a gate 28 to allow the water to enter through a suitable aperture or opening 29, which will rotate the rotor 10, and also the pulley 30, or any suitable driving wheel, over which ropes, a belt, or the like, not shown in the accompanying drawing, may be extended to drive machinery, or to perform any desired class of work, the said pulley 30 being rigidly attached to the shaft 11, by any suitable means. It will be further understood that my improved device may be suitably attached or mounted in a concrete foundation 31, provided with the necessary enclosures or abutments 32, such as is common practice for devices of this nature.

As a means of opening and closing the apertures 33 located at or near the edge of the front wall 34 of the rotor case 20, so as to increase and decrease the speed of the rotor 10, I have provided a disc or rotary valve 35, having a plurality of apertures 36, to register with the said apertures 33, and to register with the said apertures 33, and teeth 37, on its outer periphery meshing with a worm 38 rigidly attached to the shaft 39, which is rotatively mounted in suitable bearings 40 and 41, and has collars 42 and 43 attached thereto adjacent to the said bearings 40 and 41 to hold the worm 38 in mesh with the teeth 37, and has a hand wheel 44, or handle rigidly attached thereto, as a means of operating the above mentioned rotary valve 35.

As a means of determining the amount of opening of the said apertures 33, I have provided a hand or pointer 45 held in a stationary position, and a sector 46 having teeth meshing with a worm wheel 47 rigidly attached to the above mentioned shaft 39, the said sector 46 rotatively mounted in a suitable bracket 48 rigidly attached to the case 26, as at 49, the said sector 46 being provided with suitable markings or graduations in degrees, adjacent to, so as to register with the pointer 45, to designate the amount of opening of the above mentioned apertures 33.

As a means of opening and automatically operating the heretofore mentioned rotary valve 32, I have provided a float 50, of any suitable shape and size, rigidly attached to the lower extremity of a vertical rod 51 slidably mounted, as at 52, the said vertical rod 51 has rigidly attached at or near its upper extremity a cross arm 53, which is also rigidly attached to the second vertical shaft 54, at or near its upper extremity, the second vertical shaft 54 is slidably mounted in a conveniently located bracket 55, as at 56, and has a rack 57 cut or otherwise formed at its lower extremity, meshing with a gear 58 rigidly attached to the heretofore mentioned shaft 39, the rack 57 being slidably held in an engaged position with the gear 58 by an elongated slot 59 formed in the bracket 60.

As a means of diverting the water, so as to cause it to pass through the apertures 33, when the apertures 33 are open, I have provided a head 61, conical shaped and preferably hollow or cored, as at 62, attached to the heretofore mentioned shaft 11, by a cap 63, or any similar suitable device.

It is obvious that I have provided a manually operated, and an automatically operated means of controlling the speed of the heretofore mentioned rotor 10, it being understood that the rise and fall of the head of water, as designated by the reference numeral 27, will open and close the apertures 33 by means of the float 30 and the heretofore mentioned connected mechanism.

The rotor case 26 is provided with a door 26' for cleaning rotor 10.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:—

1. The combination with a water turbine, a water supply reservoir at one end of said turbine, a casing attached to said reservoir for conveying water therefrom to said rotor, a rotary valve disposed in said casing for controlling the flow of water therethrough comprising a disc having spaced apertures near the periphery thereof, a baffle disposed in said casing for directing the water to said apertures, teeth on the periphery of said valve, a shaft having a worm thereon meshing with the teeth of said valve, a pinion on the end of said shaft, a substantially vertical bar slidably mounted on said supply reservoir having a rack on the lower end thereof meshed with said pinion, a float disposed in said reservoir, a slidable rod rigidly secured to said float and slidably mounted in the upper wall of said reservoir, and an arm connected with said rod at one end and with said rack bar at the other, said float being adapted to be supported by the water in said reservoir and to be raised thereby to lift said rack bar for rotating said shaft and the valve connected therewith to reduce the flow of water through said valve.

2. In a device of the class described, a reservoir casing, a valve operating mechanism for turbines comprising a float disposed in said casing, a rod rigidly attached to said float and slidably mounted in the upper wall of said casing, a vertical shaft slidably mounted exterior of said casing on the side wall thereof, rack teeth on the lower end portion of said shaft, a cross rod rigidly attached at one end to said vertical shaft and at the other end to the vertical rod of said float, and a pinion positioned to engage said rack teeth and adapted to be rotated by upward and downward movements of said shaft to regulate automatically the flow of water to said turbine for decreasing such flow when the float is raised by water in said reservoir and for increasing such flow when the float is lowered.

In testimony whereof I have affixed my signature.

JOSEPH LEOPOLD.